United States Patent [19]

DuVall et al.

[11] 4,164,146

[45] Aug. 14, 1979

[54] APPARATUS AND METHOD FOR MONITORING THE PRESENCE OF A CONDUCTIVE MEDIA

[75] Inventors: Bruce W. DuVall; James W. Valentine; Kenneth O. Morey, all of Colorado Springs, Colo.

[73] Assignee: The United States of America as represented by the United States Department of Energy, Washington, D.C.

[21] Appl. No.: 738,180

[22] Filed: Nov. 2, 1976

[51] Int. Cl.² ............................................. G01F 23/26
[52] U.S. Cl. ................................................. 73/304 R
[58] Field of Search ........................ 73/304 R, 290 R; 176/19 R; 340/196

[56] References Cited

U.S. PATENT DOCUMENTS

| | | | |
|---|---|---|---|
| 3,402,607 | 9/1968 | Cambillard et al. | 73/304 R |
| 3,722,281 | 3/1973 | Marsh | 73/304 R |

FOREIGN PATENT DOCUMENTS

1412513  11/1975  United Kingdom ................. 73/304 R

*Primary Examiner*—Donald O. Woodiel
*Attorney, Agent, or Firm*—Dean E. Carlson; R. G. Erdley; Max L. Wymore

[57] ABSTRACT

An inductive level sensor has inductively coupled primary and secondary windings. Circuitry drives the primary with an AC signal of constant current magnitude and selected frequency f to induce in the secondary, a voltage signal V of magnitude $|V|$, frequency f and phase difference $\phi$ from the driving signal. Circuitry operates to generate a voltage output signal proportional to $|V| \cos(\phi - \theta)$, where $\theta$ is a selectively set phase shift factor. By properly and selectively adjusting the frequency f and phase shift factor $\theta$, an output signal $|V| \cos(\phi - \theta)$ can be provided which self-compensates for changes in mutual inductance caused by operating temperature variations so that an output signal is produced which is substantially linearly proportional to changes in the level of a pool of liquid metal being monitored. Disclosed also is calibration circuitry and circuitry for converting the voltage signal $|V| \cos(\phi - \theta)$ into a current signal.

12 Claims, 7 Drawing Figures

APPARATUS AND METHOD FOR MONITORING THE PRESENCE OF A CONDUCTIVE MEDIA

BACKGROUND OF THE INVENTION

The present invention relates to level detection and sensing through the technique of monitoring variations in the mutual inductance of coupled inductors.

Heretofore, level detection devices having level sensors formed by inductively coupled coils have been utilized in atomic energy work to monitor the level of liquid metal coolant employed in nuclear reactors. One liquid metal presently employed as a coolant in nuclear reactors is the electrically conductive material liquid sodium, and such inductive level sensors have been found to be particularly useful for measuring the surface level of liquid sodium in nuclear reactors.

The operation of such inductive level sensors is based on the fact that in a detecting element formed by inductively coupled primary and secondary coils the mutual inductance between the two coils is dependent upon the electrical material surrounding the coils. In particular, if the primary and secondary coils are surrounded by a conductive material, such as liquid sodium, the mutual inductance between the two coils will be substantially different than if they were surrounded by air.

Accordingly, the level of a pool of liquid sodium can be monitored by placing such an inductive level sensor so that the extent its coils are surrounded by liquid sodium varies proportionally as a function of pool level and driving its primary winding to induce an output across its secondary coil. In accordance with Faraday's law of induction, the induced output of the secondary coil is directly proportional to the mutual inductance between the primary and secondary coils. Since the mutual inductance between the two coils is proportional to the fractional extent the coils are surrounded by liquid sodium, which in turn is directly proportional to the level of the pool of liquid sodium, it is thus apparent that the induced output of the secondary coil varies as a function of pool level and can be utilized to provide a measurement of the level of the pool of liquid sodium. In absence of variations in the conditions under which the inductive level sensor is operating, the induced output of the secondary coil provides a measurement of pool level which is substantially linearly proportional.

In the operation of a nuclear reactor, however, the conditions under which the inductive level sensor operates do not remain constant. In particular, the temperature range in which the inductive level sensor operates varies substantially due to the fact that the temperature of the liquid sodium coolant typically varies during reactor operation from a low of 300° F. to a high of 1200° F. Such operating temperature variations, in addition to causing changes in the electrical resistance of the inductive coils making up the level sensor, have also been found to cause major variations in the coils mutual inductance parameter, i.e., the mutual inductance between the coils is highly temperature sensitive and dependent.

Heretofore, attempts have been made to compensate for or eliminate the effects of temperature variations on the operation of such inductive level sensors. For example, see the following U.S. patents: Marinaccio U.S. Pat. No. 3,896,671; Kokayashi et al U.S. Pat. No. 3,834,234; and, Cambillard et al U.S. Pat. No. 3,402,607. Such attempts have not proven to be entirely satisfactory, and accordingly, the problem of operating temperature variations effecting level measurements made by such inductive level sensors has continued to be a problem of major concern in the atomic energy industry.

SUMMARY OF THE INVENTION

It is an object of the present invention to provide an improved apparatus and method for level detection and sensing utilizing the mutual inductance parameter of coupled inductive coils to monitor level changes which is characterized by being substantially self-compensating for temperature effects and particularly suited for use with nuclear reactors to measure the level of a liquid metal coolant therein, such as liquid sodium.

It is further an object of the present invention to provide an improved inductive level sensing apparatus and method as set forth wherein an AC signal of constant current magnitude is employed to drive the primary of a pair of inductively coupled coils and an output signal self-compensating for temperature effects is generated by utilizing both the magnitude and phase of the voltage signal induced on the secondary of the pair of inductively coupled coils.

It is another object of the present invention to provide an improved inductive level sensing apparatus and method as set forth wherein both the magnitude and phase of the induced voltage signal are utilized to generate the self-compensating output signal by generating the product of the magnitude of the induced voltage signal and the cosine of its phase angle.

It is additionally an object of the present invention to provide an improved inductive level sensing apparatus and method as set forth wherein the frequency of the AC driving signal is selectively set to have an optimum value for compensating for temperature effects.

It is also an object of the present invention to provide an improved inductive level sensing apparatus and method as set forth wherein in conjunction with the selective setting of the frequency of the AC driving signal, the effective phase difference or angle between the driving current signal and induced voltage signal is shifted an optimum amount.

In accomplishing these and other objects, there is provided an inductive level sensor made up of inductively coupled primary and secondary windings or coils. Circuitry is provided for driving the primary winding with an AC signal I of substantially constant current magnitude $|I|$ and frequency f, the frequency f at which the current signal I is generated being adjustable and selectively settable. The constant current signal I applied to the primary coil generates an induced voltage signal V across the secondary winding; the voltage signal V having a magnitude $|V|$, frequency f and induced phase angle or difference $\phi$ from the current signal I. Selectively adjustable phase sensitive circuitry is provided for generating a voltage signal equal to the product of the magnitude $|V|$ of the induced voltage signal V times $\cos(\phi-\theta)$, where $\theta$ is a phase shift factor which can be set into the phase sensitive circuit by selectively adjusting it so as to produce as far as the phase sensitive circuitry is concerned an effective phase difference between the Signals I and V equal to the phase angle $\phi-\theta$. By properly and selectively adjusting the frequency f in conjunction with the phase shift factor $\theta$, it has been found that an output signal $|V|\cos(\phi-\theta)$ can be provided which self-compensates for changes in mutual inductance caused by operating temperature variations so as to produce an output signal which is substantially linearly proportional to changes in the level of a pool of liquid metal being monitored.

Circuitry for calibrating the phase sensitive circuitry and converting its voltage output signal to a current signal is also provided.

Additional objects of the present invention also reside in the construction of the exemplary level sensing apparatus hereinafter described in conjunction with the several drawings and in its method of operation.

DETAILED DESCRIPTION OF THE PREFERRED EMBODIMENT

Figure 1:
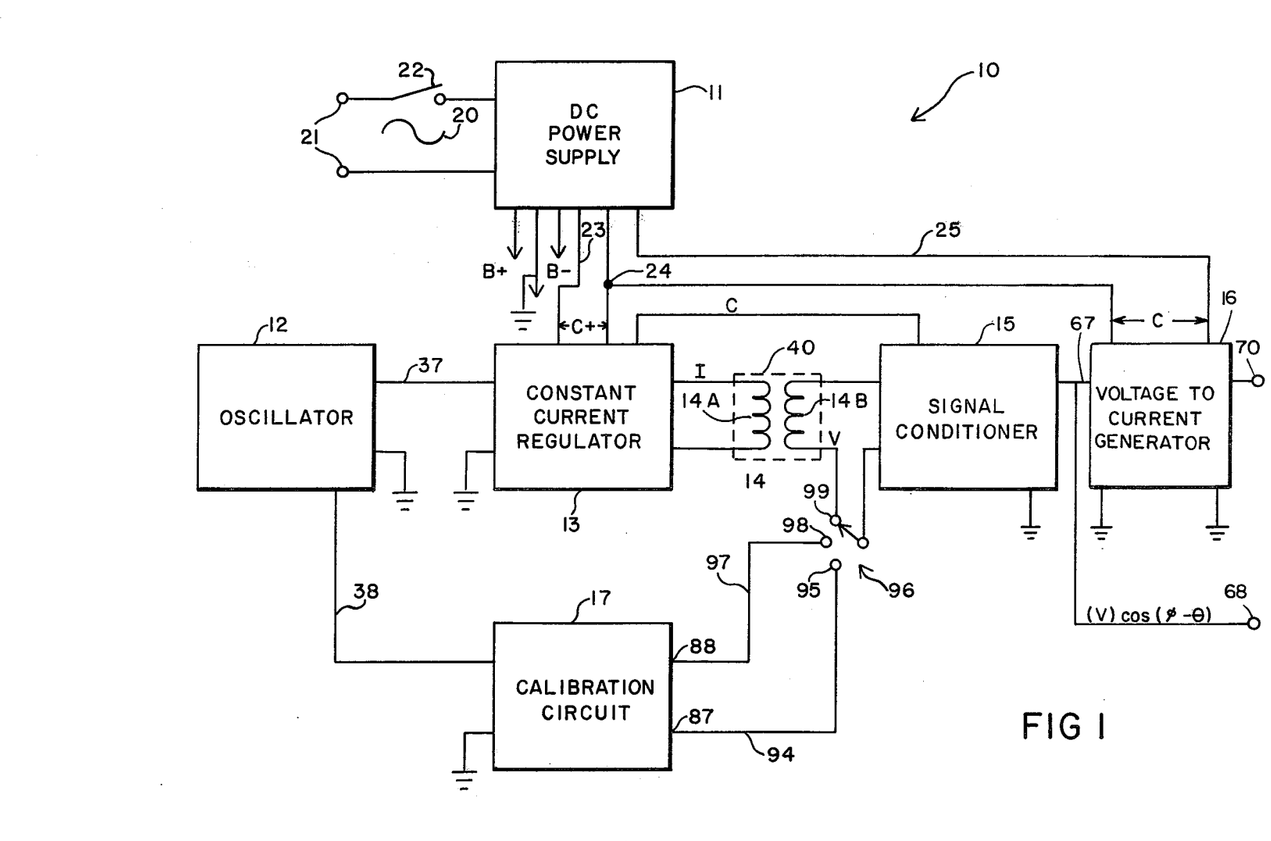
FIG. 1 is a block diagram of an inductive level sensing apparatus according to the present invention.

Referring to the drawings in more detail, there is shown in FIG. 1 an inductive surface level sensing apparatus generally identified by the numeral 10.

The inductive surface level sensing apparatus 10 includes a DC power supply 11, oscillator 12, constant current regulator 13, inductive probe 14, signal conditioner 15, voltage to current generator 16 and calibration circuit 17.

The DC power supply 11 may be of any well-known conventional type, receives power from an AC source 20 connected across power input terminals 21 and has an on-off switch 22. The DC power source 11 generates B+, ground and B− DC voltages which are supplied to each of the circuits 12, 13, 15, 16 and 17. One suitable value for the DC supply voltages B+, ground, B− is, respectively, +15, 0 and −15 volts. The power supply also generates a C+ DC voltage signal between leads 23, 24 and a C− DC voltage signal between leads 25, 24. The C+ and C− voltages may be +48 and −48 volts DC.

Figure 2:
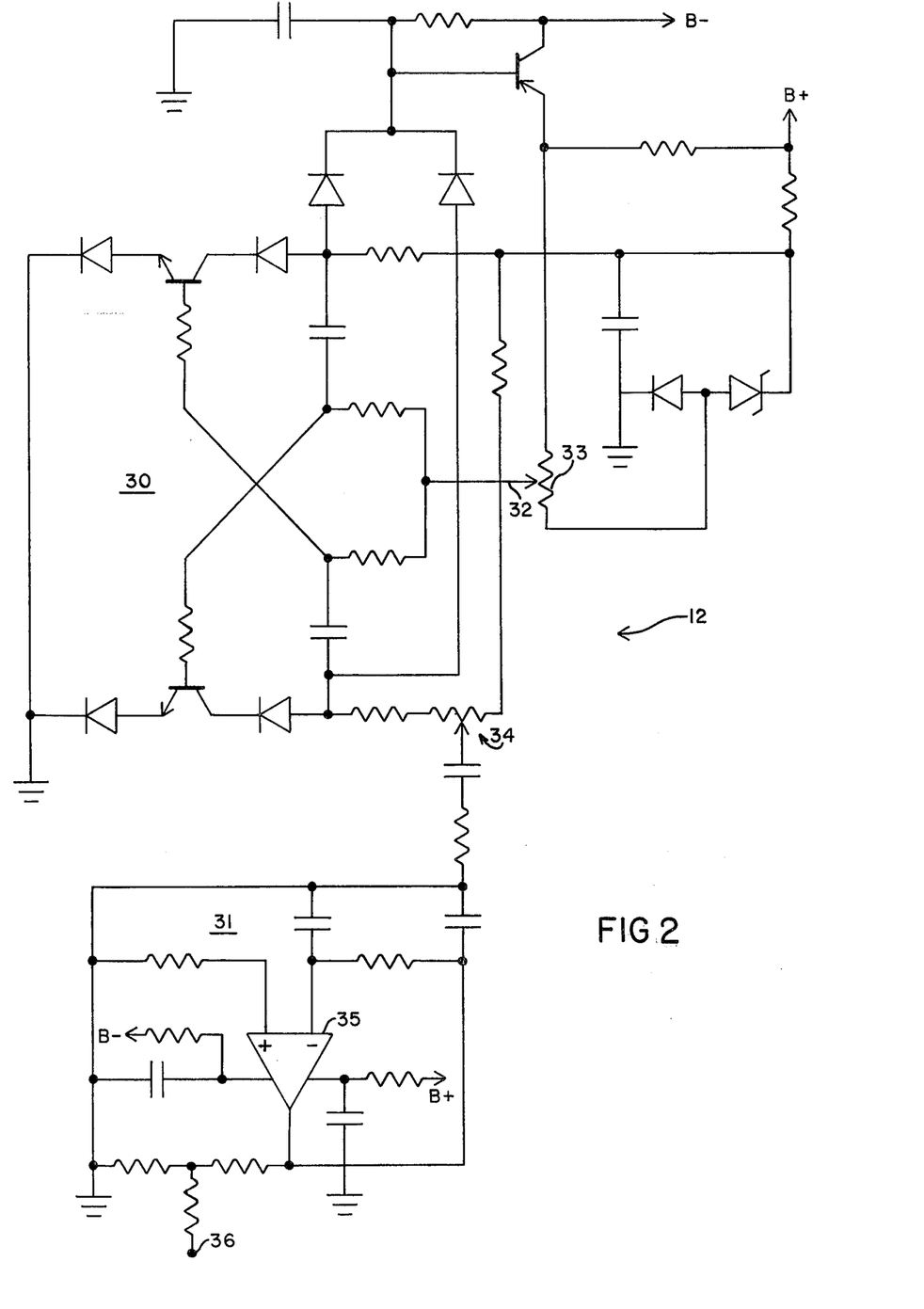
FIG. 2 is a circuit diagram of an oscillator suitable for use in the apparatus of FIG. 1.

One suitable circuit for the oscillator 12 is shown in FIG. 2. The oscillator 12 there shown is made up of a conventional multivibrator 30 and a conventional filter circuit 31. The output frequency f of the multivibrator is selectively settable by adjustment of the pickoff 32 of the variable resistor 33, and in operation of the apparatus 10 will generally be a signal in the range of 3-4 K Hertz. The magnitude of the multivibrator output signal transmitted to the filter circuit 31 is determined by the setting of the variable resistor 34. The filter circuit 31, which includes the operational amplifier 35, operates to convert the pulsed output of the multivibrator 30 into a sinusoidal or AC output at the selected frequency f. This sinusoidal output at frequency f is generated on output terminal 36 and is transmitted therefrom over leads 37, 38 to the constant current regulator circuit 13 and calibration circuit 17, respectively.

The constant current regulator 13 is conventional in construction and operates to convert the sinusoidal output of oscillator 12 into a constant current AC signal I of frequency f which is applied as a driving signal across the primary winding 14A of the inductive probe 14. The regulator 13 also generates from the sinusoidal output of the oscillator 12 a clock signal C of frequency f which is in phase with the AC current signal I. The clock signal C is supplied on lead 39 to the signal conditioner 15.

The inductive probe 14 is conventional in construction and is made up of inductively coupled primary and secondary windings 14A and 14B. The primary and secondary windings 14A and 14B have a common substantially straight coil axis which defines the longitudinal axis of the probe 14.

The probe 14 is shown in FIG 1 in situ monitoring the level of a pool of liquid sodium 40 in a nuclear reactor. During operation of the reactor, the temperature of the coolant provided by the liquid metal sodium pool 40 varies in the range of from 300° F. to 1200° F. The pool of liquid sodium 40 is represented by the dashed line rectangle shown enclosing the probe 14. In use, the probe 14 is positioned relative to the pool of liquid sodium 40 with its coil axis perpendicular to the level of the liquid sodium so that as the level of the pool of liquid sodium changes the degree of insertion of the length of the probe 14 in the pool 40 changes proportionately.

In response to the AC current signal I exciting the primary winding 14A of the probe 14, a voltage signal V is induced on the probe's secondary winding 14B. The induced voltage V is an AC signal of magnitude $|V|$, phase angle $\phi$ and frequency f. The phase angle $\phi$ represents the angular phase difference between the driving constant current signal I and the induced output voltage V. As hereinafter explained, this induced voltage output V is processed by the signal conditioner circuit 15 to generate a system output which is substantially linearly proportional to the level of the pool 40 being monitored by the inductive probe 14.

Figure 3:
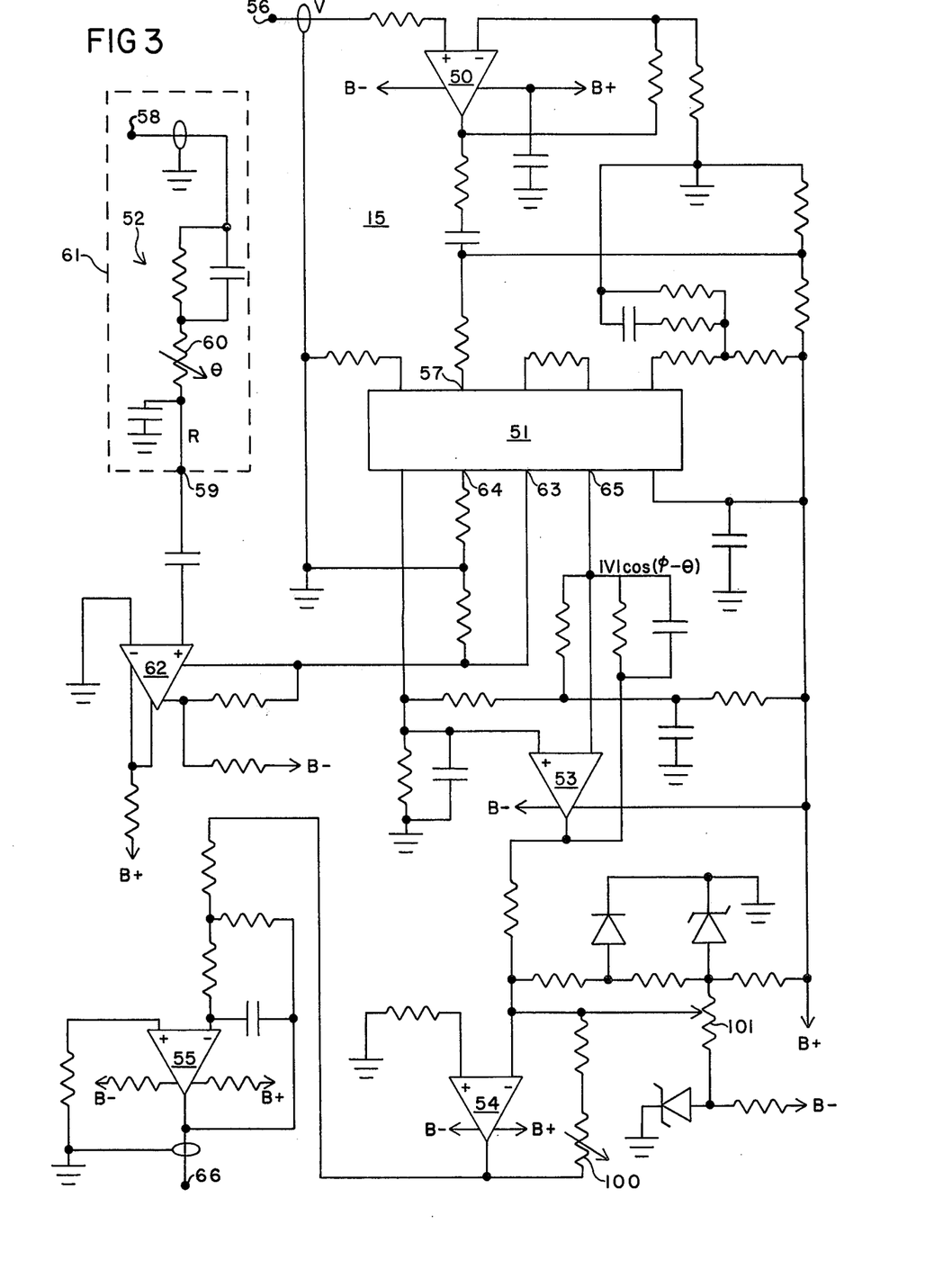
FIG. 3 is a circuit diagram of a signal conditioner suitable for use in the apparatus of FIG. 1.

The circuitry of a preferred signal conditioner 15 is shown in FIG. 3. The signal conditioner 15 includes an input amplifier stage 50, cosine detector 51, phase shifting circuit 52 and serially connected output amplifier stages 53-55. Each of these amplifier stages is formed by an operational amplifier connected and biased in a conventional manner.

The induced voltage V on the probe's secondary winding 14B is received on the input terminal 56 and is applied by the amplifier 50 as an input on terminal 57 of the cosine detector 51. The clock signal from the regulator 13 is supplied to the input terminal 58 of the phase shifting circuit 52. The phase shifting circuit operates to generate on its output terminal 59, an AC reference signal R of frequency f which is shifted by a phase angle $\phi$ from the clock signal. The reference signal R is hence phase shifted the angle $\phi$ from the constant current AC signal I driving the probe 14 since the clock signal C and driving signal I are substantially in phase.

Figure 4:
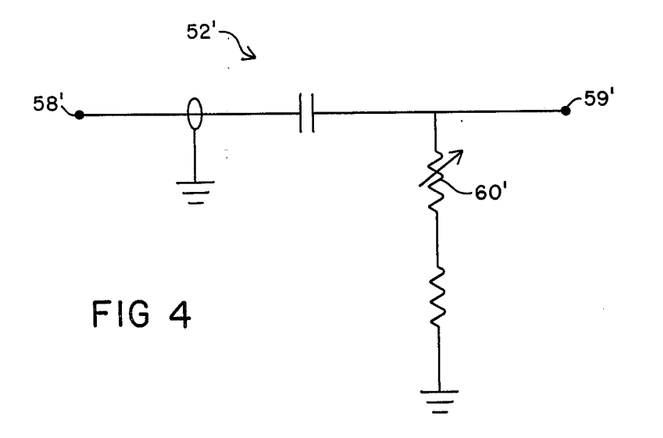
FIG. 4 is an alternate form of phase shifting circuit suitable for use in the signal conditioner of FIG. 3.

The angle $\phi$ by which the reference signal R is phase shifted by the phase shifting circuit 52 may be selectively set by adjusting the variable resistor 60 therein. The phase shifting circuit 52 is shown enclosed in dashed lines 61 and an alternate phase shifting circuit which may be used in place of the circuitry shown enclosed in the dashed lines 61 is illustrated in FIG. 4. The alternate phase shifting circuit is generally identified in FIG. 4 by the numeral 52' and has its input and output terminals identified by the numerals 58' and 59', respectively. In the circuit of FIG. 4, the phase angle $\phi$ is selectively set by setting the variable resistor 60'.

The reference signal R is transmitted by operational amplifier 62 across terminals 63 and 64 of the cosine detector 51.

The cosine detector 51 is conventional in construction and may be a balanced modulator-demodulator such as an MC 1496 or MC 1596 manufactured by Motorola Semiconductor Products, Inc. of Phoenix, Ariz. or an SG 1496 or SG 1596 manufactured by Silicon General of Westminster, Calif. The cosine detector 51 operates to generate as an output of terminal 65, a signal of frequency f directly proportional to $|V| \cos(\phi - \theta)$, where $|V|$ is the magnitude of the AC voltage V induced on the probe's secondary winding 14B, $\phi$ is the phase angle difference between the constant current AC driving signal I and the reference signal R. As is apparent, the output $|V| \cos(\phi - \theta)$ is a function of the real component of the induced voltage V. As herein discussed, by appropriately setting the frequency f, i.e., by adjusting the oscillator 12, and the phase shift angle $\phi$, i.e., by adjusting the phase shifting circuit 52, it has been found that output $|V| \cos(\phi - \theta)$ can be made to be substantially independent of operating temperature influencing the probe 14 and hence a substantial linear function of the depth of the inductive probe 14 in the pool 40. Hence, the output $|V| \cos(\phi - \theta)$ with the parameters f and $\theta$ appropriately set in the system 10 provides a substantially linear measurement of the level of the pool of liquid sodium 40 which self-compensates for temperature effects.

The output $|V| \cos(\phi - \theta)$ is amplified by amplifier stages 53–55 and appears as a system voltage output on output terminal 66 in FIG. 3, and lead 67 and terminal 68 in FIG. 1.

The voltage to current generator 16 shown in FIG. 1 is conventional in construction and operates to convert the system output voltage signal $|V| \cos(\phi - \theta)$ to a current signal on output lead 70.

The system voltage and current outputs on 68 and 70 can be connected to drive conventional display devices to indicate and display measurements of the level of the pool 40.

Figure 5:
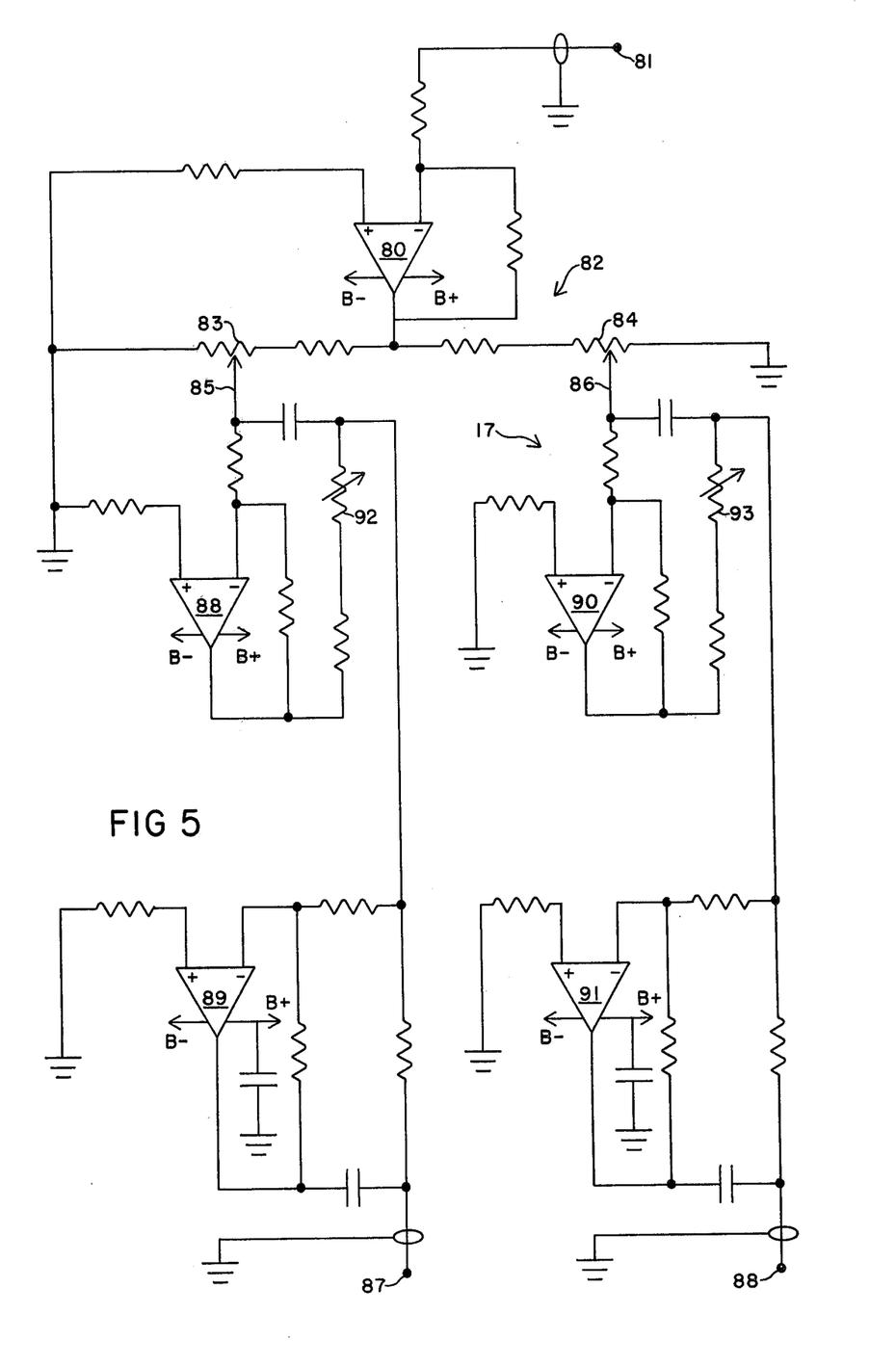
FIG. 5 is a circuit diagram of a calibration circuit suitable for use in the apparatus of FIG. 1.

FIG. 5 illustrates a circuit suitable for use as the calibration circuit 17. The calibration circuit 17 operates to simulate the output of the probe 14 when the level of the pool 40 is zero and also when its level is full.

The calibration circuit 17 is made up of an input amplifier stage 80 formed by an operational amplifier. The amplifier stage 80 receives as an input on terminal 81 the output of the oscillator 12 and generates a calibration signal across the voltage divider circuit 82. Outputs are taken from the resistors 83, 84 by adjustable voltage pickoffs 85, 86, respectively. The output on pickoff 85 is used to generate the full scale calibration signal while the output on pickoff 86 is employed to generate the zero level calibration signal.

Figure 6:
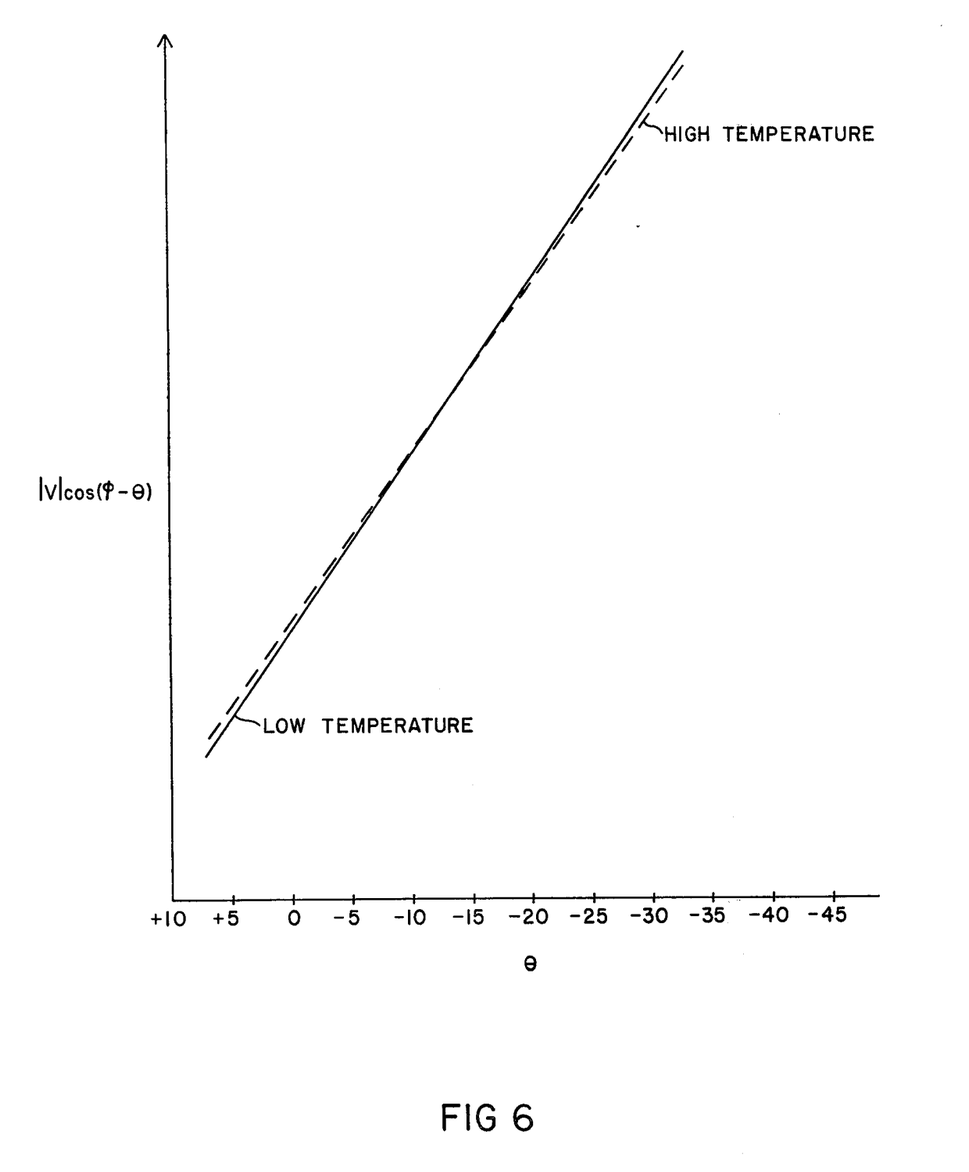
FIG. 6 is a plot of the magnitude of the inductive probe's induced output voltage $|V|$ versus its phase angle $\phi$; and, FIG. 7 is a plot of the magnitude of the inductive probe's induced output voltage $|V|$ versus the frequency f of the constant current AC signal I driving the probe.

FIG. 6 is shown to illustrate the typical manner in which the induced output V of the probe varies in both magnitude $|V|$ and phase angle $\phi$ under constant temperature and frequency conditions. Thus, it is apparent to simulate the output of the probe 14 both for zero and full level conditions the magnitude as well as the phase of the output V must be simulated.

Calibration of the system 10 is accomplished in the following manner. First, the magnitude and phase of the induced output V are measured for no sodium and full sodium conditions. The voltage pickoffs 85, 86 are then appropriately adjusted so that an appropriate magnitude signal representing full and zero levels will appear on output terminals 87, 88, respectively. The voltage set on the pickoff 85 is processed by the amplifying phase shifting circuitry provided by the operational amplifiers 88, 89 while the voltage on pickoff 86 is similarly processed by the circuitry provided by operational amplifiers 90, 91. The phase angle $\phi$ of the simulated full and zero level signals is appropriately set by adjusting the variable resistors 92 and 93, respectively.

The upper surface or full level signal on terminal 87 is supplied by lead 94 to terminal 95 of the three position selector switch 96 shown in FIG. 1. The lower surface or zero level signal on terminal 88 is supplied by lead 97 to terminal 98 of the switch 96. The third terminal 99 of the switch 96 receives the actual voltage V from the probe 14. In calibration of the system 10, the switch 96 is switched to full position, i.e., terminal 95, and the variable resistor 100 in the signal conditioner 17, which is shown in FIG. 3, is adjusted so that the system output on terminal 66 is calibrated at the maximum level. In a similar manner, by switching the switch 96 to terminal 98 and adjusting the variable resistor 101 shown in FIG. 3, the system 10 is calibrated to its minimum output level.

Figure 7:
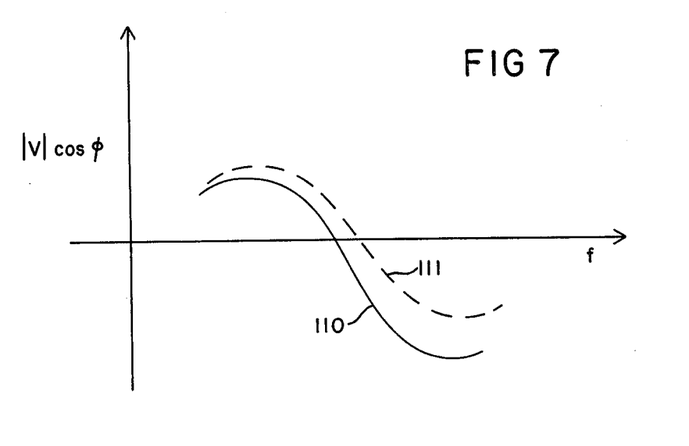

FIG. 7 shows the effect of the frequency f of the constant current driving signal I on the output voltage $|V| \cos \phi$. The plot designated by the numeral 110 indicates the variations in magnitude $|V| \cos \phi$ at a first constant temperature, i.e., a low temperature of 300° F., while the plot designated 111 illustrates the shift caused by a higher operating temperature. The plot 111 is for a second constant temperature, i.e., a high temperature of 1200° F. This upward shift in the output plot occurs since the resistivity of the conductive materials in the probe 14 and of the sodium in the pool 40 increases with increasing temperature. Hence, the inductive coupling between the coils 14A and 14B and the mutual inductance M of the probe 14 increases.

It is noted that while there is a certain degree of change of resistivity in the materials forming the probe 14 and its protective housing that the most significant resistivity change influencing the mutual inductance of the probe 14 is that occurring in the pool 40 of liquid sodium. In the temperature range of from 300° F.–1200° F., the resistivity of the sodium changes by almost a factor of three. It is this large effect which heretofore has proven so difficult to compensate.

In operation of the level sensing apparatus 10, it has been found that by driving the primary coil 14A at a constant current, temperature effects resulting from changes in the resistance of the coils 14A, 14B are substantially eliminated. Further, it has been found that there exists a combination of signal frequency f and phase shift factor $\theta$ where at the system output, $|V| \cos(\phi - \theta)$ is essentially independent of the change in the mutual inductance of the probe 14 caused by temperature changes. The phase shift factor $\theta$ appears to be probe length sensitive and is directly proportional to probe length. For probes built to date the phase shift factor $\theta$ suitable for a particular length probe has ranged from about 10° for the shortest probe to about 75° for the longest probe.

Thus, an improved apparatus and method has been provided for generating a substantially linear measurement of the level of liquid metal, such as liquid sodium in a nuclear reactor, which self-compensates for measurement errors due to temperature effects. The improved apparatus and method utilize inter alia the concepts of driving the inductive probe primary with a constant current of selected frequency, generating an output as a measurement of level which is phase sensitive and a function of the cosine of the induced probe voltage, and selectively setting the frequency at which the signals are generated as well as selectively introducing a phase shift factor between the driving signal input and induced output to minimize temperature effects.

While the example illustrates the use of the probe for the measurement of the level of a liquid metal such as liquid sodium, it will be understood by those skilled in the art that the invention may also be used to detect and measure that portion of a probe surrounded or circumscribed by a conductive media, whether liquid or solid, and whether it be one end of the other of the probe or an intermediate portion that is surrounded by the conductive media.

What is claimed is:

1. In a conductive media detecting apparatus of the type in which primary and secondary windings are inductively coupled together and the presence of and the proportion thereof immersed in surrounding liquid metal varies the coupling and hence mutual inductance parameter between said coils, the improvement in combination therewith of:

means for exciting said primary winding with an AC signal of substantially constant current and selectively settable frequency f to induce an AC voltage signal of frequency f on said secondary winding; and, means responsive to said induced voltage signal for generating an output signal which is a measure of the presence of a conductive media being monitored, said output signal generating means being operable to generate said output signal as a function of the product of the magnitude of said induced voltage signal and the cosine of the angle of phase difference between said constant current signal and induced voltage signal.

2. In a conductive media detecting apparatus of the type in which primary and secondary windings are inductively coupled together and the presence of and the proportion thereof immersed in surrounding liquid metal varies the coupling and hence mutual inductance parameter between said coils, the improvement in combination therewith of:

means for exciting said primary winding with an AC signal of substantially constant current and selectively settable frequency f to induce an AC voltage signal of frequency f on said secondary winding;

means responsive to said induced voltage signal for generating an output signal which is a measure of the presence of a conductive media being monitored, said output signal generating means being operable to generate said output signal as a function of the product of the magnitude of said induced voltage signal and the cosine of the angle of phase difference between said constant current signal and induced voltage signal;

the angular phase difference between said constant current and induced voltage signals varies as a function of the inductive coupling of said windings and is designated $\phi$;

the magnitude of said induced voltage signal is $|V|$;

the output signal generated by said output signal generating means is directly proportional to $|V| \cos(\phi - \theta)$, where $\theta$ is a phase shift factor which may be selectively set; and, said means for exciting said primary winding with said constant current signal includes a frequency adjustable oscillator operable to generate an AC signal at said frequency f and a constant current regulator operable to generate from said oscillator AC signal said constant current signal.

3. In a conductive media detecting apparatus of the type in which primary and secondary windings are inductively coupled together and the presence of surrounding liquid metal varies the coupling and hence mutual inductance parameter between said coils, the improvement in combination therewith of:

means for exciting said primary winding with an AC signal of substantially constant current and selectively settable frequency f to induce an AC voltage signal of frequency f on said secondary winding;

means responsive to said induced voltage signal for generating an output signal which is a measure of the presence of a conductive media being monitored, said output generating means being operable to generate said output signal as a function of the product of the magnitude of said induced voltage signal and the cosine of the angle of phase difference between said constant current signal and induced voltage signal;

the angular phase difference between said constant current and induced voltage signals varies as a function of the inductive coupling of said windings and is designated $\phi$;

the magnitude of said induced voltage signal is $|V|$;

the output signal generated by said output signal generating means is directly proportional to $|V| \cos(\phi - \theta)$, is a phase shift factor which may selectively set;

said means for exciting said primary winding with said constant current signal includes a frequency adjustable oscillator operable to generate an AC signal at said frequency f and a constant current regulator operable to generate from said oscillator AC signal said constant current signal;

said means for exciting said primary winding with said constant current signal includes means responsive to said oscillator AC signal to generate a clock signal at frequency f substantially in phase with said constant current signal; and, said output signal generating means includes selectively settable means responsive to said clock signal for generating a reference signal shifted in phase said selected phase angle $\theta$ from said constant current signal and means responsive to said induced voltage and reference signals for generating a signal proportional to said product of $|V| \cos(\phi - \theta)$.

4. The invention defined in claim 3, including means for calibrating said output signal generating means.

5. The invention defined in claim 4, wherein:

said calibrating means is responsive to said oscillator AC signal and is operable to generate therefrom a first signal corresponding in magnitude and phase to said induced voltage signal at full level and a second voltage signal corresponding in magnitude and phase to said induced voltage signal at zero level; and, including:

switch means for selectively supplying either said induced voltage signal, said first calibration signal or said second calibration signal to said output signal generating means; and, wherein:

said output signal generating means includes circuitry for adjusting its maximum output to correspond to said first calibration signal and its minimum output to correspond to said second calibration signal.

6. The invention defined in claim 5, wherein said primary and secondary windings form an inductive probe having a longitudinal axis which is positioned normal to the surface of a conductive media to be monitored.

7. The invention defined in claim 5, wherein said primary and secondary windings are each bifilar coils.

8. The invention defined in claim 7, including means for converting said output signal into both voltage and current signals which are a measure of the level of the liquid metal being monitored.

9. The invention defined in claim 3, wherein said primary and secondary windings form an inductive probe having a longitudinal axis which is positioned normal to the level of a pool of liquid metal to be monitored.

10. A method of measuring the presence of a conductive media comprising the steps of:

monitoring the presence of the conductive media with an inductive sensing element of the type in which primary and secondary windings are inductively coupled together and the presence of and the proportion thereof immersed in surrounding conductive media varies the coupling and hence mutual inductance parameter between said coils;

immersing a portion of the sensing element into the conductive media;

exciting said primary winding with an AC signal of substantially constant current and selectively settable frequency f to induce an AC voltage signal of frequency f on said secondary winding;

generating an output signal as a function of the product of the magnitude of said induced voltage signal and the cosine of the angle of phase difference between said constant current signal and induced voltage signal; and, adjusting the frequency f to minimize variations in said output signal caused by temperature effects.

11. The method of claim 10, wherein:

the angular phase difference between said constant current and induced voltage signals varies as a function of the inductive coupling of said windings and is designated $\phi$;

the magnitude of said induced voltage signal is $|V|$; and, said output signal generated is directly proportional to $|V| \cos (\phi - \theta)$ where $\theta$ is a phase shift factor which may be selectively set; and including the steps of:

concurrently adjusting the frequency f and phase shift factor $\theta$ to minimize variations caused in said output signal by temperature effects.

12. A method of measuring the presence of a conductive media comprising the steps of:

monitoring the presence of the conductive media with an inductive sensing element of the type in which primary and secondary windings are inductively coupled together and the presence of surrounding conductive media varies the coupling and hence mutual inductance parameter between said coils;

exciting said primary winding with an AC signal of substantially constant current and selectively settable frequency f to induce an AC voltage signal of frequency f on said secondary winding;

generating an output signal as a function of the product of the magnitude of said induced voltage signal and the cosine of the angle of phase difference between said constant current signal and induced voltage signal;

adjusting the frequency f to minimize variations in said output signal caused by temperature effects;

the angular phase difference between said constant current and induced voltage signals varies as a function of the inductive coupling of said windings and is designated $\phi$;

the magnitude of said induced voltage signal is $|V|$; and, said output signal generated is directly proportional to $|V| \cos (\phi - \theta)$ where $\theta$ is a phase shift factor which may be selectively set; including the steps of:

concurrently adjusting the frequency f and phase shift factor $\theta$ to minimize variations caused in said output signal by temperature effects;

generating a clock signal in phase with said constant current signal;

phase shifting said clock signal by a phase angle equal to $\theta$ to generate a phase shifted reference signal; and, generating said output signal by comparing said induced voltage signal and reference signal.

* * * * *